United States Patent [19]

Fremery

[11] Patent Number: 4,812,694
[45] Date of Patent: Mar. 14, 1989

[54] CONTACT FREE MAGNETIC BEARING

[75] Inventor: Johan K. Fremery, Bonn, Fed. Rep. of Germany

[73] Assignee: Kernforschungsanlage Jülich Gesellschaft mit beschränkter Haftung, Jülich, Fed. Rep. of Germany

[21] Appl. No.: 353,093

[22] Filed: Mar. 1, 1982

Related U.S. Application Data

[63] Continuation of Ser. No. 113,516, Jan. 21, 1980, abandoned, which is a continuation of Ser. No. 854,093, Nov. 23, 1977, abandoned, which is a continuation-in-part of Ser. No. 613,266, Sep. 15, 1975, abandoned.

[30] Foreign Application Priority Data

Sep. 12, 1974 [DE] Fed. Rep. of Germany ....... 2444099

[51] Int. Cl.⁴ .............................................. F16C 39/06
[52] U.S. Cl. .................................................. 310/90.5
[58] Field of Search ................... 308/10; 104/198 MS, 104/148 LM; 105/157

[56] References Cited

U.S. PATENT DOCUMENTS

| | | | |
|---|---|---|---|
| 3,243,238 | 3/1966 | Lyman | 308/10 |
| 3,565,495 | 2/1971 | Lyman | 308/10 |
| 3,741,613 | 6/1973 | Pfaler | 308/10 |
| 3,787,100 | 1/1974 | Haberman | 308/10 |
| 3,877,761 | 4/1975 | Boden | 308/10 |
| 3,890,019 | 6/1975 | Boden | 308/10 |
| 4,037,886 | 7/1977 | Boden | 308/10 |
| 4,080,012 | 3/1978 | Boden | 308/10 |
| 4,088,379 | 5/1978 | Perper | 308/10 |

Primary Examiner—R. Skudy
Attorney, Agent, or Firm—Becker & Becker, Inc.

[57] ABSTRACT

A contact free magnetic bearing in which a magnetic body is disposed between a pair of opposed magnetic poles so that the magnetic field between the poles is in supporting relation to the magnetic member disposed therebetween. Deviation of the magnetic member relative to the magnetized poles is detected and the strength of the magnetic field between each of the poles of the magnetic member is varied to establish influences acting between the poles and the magnetic member tending to restore the condition of equilibrium.

24 Claims, 3 Drawing Sheets

CONTACT FREE MAGNETIC BEARING

This is a continuation of Ser. No. 113,516 filed Jan. 21, 1980 (now abandoned), which is a continuation of Ser. No. 854,093 filed Nov. 23, 1977 (now abandoned), which is a continuation-in-part of parent application Ser. No. 613,266 filed Sept. 15, 1975,(now abandoned).

The present invention relates to a contact-free bearing element for at least partially magnetizable bodies, according to which the forces of attraction acting through air gaps within a permanent magnetic circuit and between pole pieces of a magnetic system and the magnetizable portion of said body are equalized by means of an electromagnetic stray field control which is influenced by a contact-free position sensing system and which in the case of equilibrium is wattless, while a control current is conveyed perpendicularly with regard to the magnetic flux direction in the air gap stray range.

Magnetic bearing elements are employed in particular for the journalling or mounting of bodies moved at high speed, because with these bearing elements between the bodies to be journalled and the stationary parts of the magnetic system, no mechanical contact exists, and consequently no mechanical friction forces have to be overcome in contrast to conventional bearings. This means that the driving energy required for fast moving bodies is with a magnetic journalling reduced to a considerable extent. Bodies journalled in a contact-free manner can be moved at speeds which are far higher than the speed of motions encountered in connection with conventional journalling systems. Furthermore, with contact-free bearing elements, no mechanical wear occurs. These systems therefore work practically in a service-free manner over long periods of operation. Inasmuch as contact-free bearing elements do not require any lubricants, they are particularly suitable for use in evacuated chambers. A number of contact-free bearing elements have become know according to which magnetic forces are made use of. With the bearing elements as it has become known from U.S. Pat. No. 3,473,852, it is, however, necessary that the magnetic field of force will also in case of equilibrium be maintained at least partially by means of a continuously flowing direction or alternating current. In this connection, heat losses occur which are undesired particularly when under vacuum conditions a sufficient heat discharge cannot be assured.

Furthermore, magnetic bearings have become known which in case of equilibrium work in a wattless manner. It is disadvantageous that these bearings are with regard to their local fixing unstable without additional active position stabilization in more than one degree of freedom. Thus, for instance, U.S. Pat. No. 3,512,852 discloses a permanent magnetic rotor bearing which is stable in the axial degree of freedom but is unstable in radial directions. Such magnetic bearings require at least two active controlled systems in order to realize a contact-free journalling of bodies which is stable in all directions.

"Review of Scientific Instruments" 1973, No. 9, Page 1396 discloses a magnetic bearing element which in case of equilibrium is likewise wattless and which has to be stabilized only in one degree of freedom. The position stabilization is effected by means of a control current which is guided perpendicularly with regard to the magnetic flux direction in the stray range of the air gap between the magnetic rotor and the stationary pole pieces of the magnetic system. This heretofore known control current guiding system has the material drawback that the control current affects not only the stray field of one of the air gaps but in addition thereto changes the existing magnetic field of force within the magnetic circuit, the so-called premagnetization, in such a way that depending on the direction of deviation of the magnetically journalled body from its position of equilibrium, the stiffness of the bearing is either considerably reduced or greatly increased. In view of this drawback, the said known bearing element can be used only under certain conditions which means primarily in such instances where a sufficient bearing stiffness is necessary only in one direction as is the case in particular with bearings having a vertical axis of rotation for compensating for the force of gravity. The known magnetic bearing element is therefore practically fixed as to its orientation in space.

It is, therefore, an object of the present invention to provide a contact-free bearing element with an electromagnetic stray field control which in case of equilibrium is wattless, and with which the premagnetization is in view of the control current not changed and which in any desired manner is adopted to be oriented with regard to a symmetric bearing stiffness with regard to the position of equilibrium.

It is a further object of this invention to provide a bearing element as set forth in the preceding paragraph, in which the bearing element is of a simple construction and safe in operation.

These and other objects and advantages of the invention will appear more clearly from the following specification in connection with the accompanying drawings, in which:

FIG. 1 represents the principle of a contact-free bearing element according to the invention.

FIG. 2 diagrammatically illustrates a contact-free bearing element for rotatable bodies.

FIG. 3 diagrammatically illustrates a longitudinal section through a contact-free bearing element for rotatable bodies.

Figure 1:
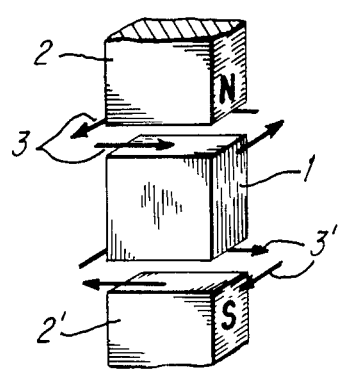

The contact-free bearing element according to the present invention is characterized primarily by the arrangement of one control current conductor each composed of one or more sections and arranged at each air gap between the magnetizable part of the body and the pole pieces of the magnetic system while the direction of rotation of the control current with regard to the magnetic flux direction in the interior of the respective air gap is in the stray range of one air gap at the same time directed opposite to the direction of rotation of the control current in the stray range of the other air gap.

Due to the respective oppositely directed direction of rotation of the control current in the control current conductors in the stray range of the air gap it will be assured that the effect exerted by the control currents onto the premagnetization will be neutralized and that the bearing stiffness will when the journalled body deviates from its position of equilibrium, independently of the direction of said deviation always be changed in the same manner. The advantage realized by the conduction of the control current becomes evident in particular with such bearing elements with which between the magnetizable part of the body and the pole piece of the magnetic system there are provided narrow air gaps and the magnetic return flux is effected primarily by ferromagnetic guiding pieces inserted primarily in the bearing element. With such bearing element, a high proportion of the permanent magnetic field energy is concentrated in the air gaps so that considerable magnetic forces are transferrable upon the journalled body. This permanent magnetic power effect remains undisturbed with the bearing element according to the invention. The bearing element according to the invention therefore, is advantageously suitable in particular for journalling relatively heavy bodies.

The control of the forces which with the bearing element according to the invention is realized by influencing the magnetic stray field in the air gaps between a magnetizable part of the journalled body and the pole pieces of the magnetic system is due to a change in the stray flux distribution at the transfer points between regions of high and low magnetic conductivity, especially in the vicinity of air gaps. The magnetic field lines generated by the control current in the control current conductors are superimposed upon the stray field lines in the vicinity of the air gaps in such a way that the stray flux density at the edge of the magnetizable part of the body increases at one of the air gaps, whereas the stray flux density decreases at the other edge with oppositely directed direction of the rotation of the control current. In this way, the interfering forces acting upon the magnetically journalled body can be equalized.

According to a further development of the invention, there is provided a control current feeding system which is closed in an annular manner and which is located within the stray region of the respective air gap. In connection with the journalling of rotatable bodies it is expedient that the magnetizable part of the body and the pole pieces of the magnetic system and rotation symmetrically arranged with regard to the magnetic direction of the flux. An increase in the radial bearing forces is in an advantageous manner realized by the fact that the magnetizable part of the body and the pole pieces of the magnetic system are made of coaxial tubular sections which are arranged at the air gap and have the same diameter. With this form of the magnetizable part of the body and of the pole pieces for the magnetic system, there additionally exists the possibility to take advantage for other technical purposes of the space surrounded by the bearing parts. Such other technical purposes may include, for instance, the passage of required transporting conduits such as conveying conduits for substances in connection with ultra centrifuges. According to the invention, it is provided for returning the magnetic flux, to provide a flux-conveying member which extends along the axis of rotation of the magnetizable part of the body and of the pole pieces of the magnetic system.

A further advantageous development of the invention consists in that the pole pieces of the magnetic system consists of a highly coercive material with low magnetic conductivity. In view of the low magnetic conductivity of the pole pieces, control current conveying means are employable the cross sections of which are considerably enlarged relative to the dimensions of the air gaps. The electrical power to be produced for compensating for the interferring forces in the control current guiding means is therefore reduced correspondingly.

According to a further development of the invention, it is provided that the control current flowing in the control current conveying means is controlled by means of the outgoing signal of a phase-bridge-discriminator which contains the control current guiding means as components. Advantageously, in such an instance the control current guiding means arranged in the air gap stray range serves simultaneously for a contact-free position sensing and for stabilizing the bearing elements.

A further advantageous design of the invention consists primarily in that at least one of the portions of the current control guiding means is in the stray range of one air gap electrically conductively connected with at least a portion of the control current guiding means in the stray range of the other air gap. In this connection, it is expedient that one portion of the control feeding means of one air gap is connected with a portion of the control current guiding means of the other air gap to form an annularly closed conductive circuit. Such an arrangement has the advantage that the direction of rotation of the control current which extends in opposite direction will be obtained automatically within the stray range of the air gaps without special provisions.

According to a further development of the invention, the magnetizable part of the body is designed as rail which extends perpendicularly with regard to the magnetic flux in the interior of the air gaps between the pole pieces of the magnetic system while the pole pieces are connected to an article which contactfree moves on the rail. The bearing element according to the invention is therefore particularly suitable for the employment of rail vehicles. in this instance, the connection of the control current guiding means to form annularly closed conductive circuits and the arrangement thereof at both sides of the rails is particularly advantageous.

Referring now to the drawings in detail, with a contact-free bearing element according to the invention in which magnetic fields are employed for conveying forces, it will be seen from FIG. 1 that forces of attraction act upon a magnetizable part 1 of a body to be journalled and do so through air gaps between the magnetizable part 1 and the pole pieces 2, 2' of a magnetic system, in magnetizing direction. These forces of attraction hold the body in a stable position. When the body deviates from its position of equilibrium which is secured by means of a contact-free position sensing, the forces of attraction are equalized by an electromagnetic stray field control which is wattless in condition of equilibrium. To this end, is is provided in conformity with the invention to arrange a control current conductors 3, 3' in the stray field of each air gap. By means of said control current conductors, one control current each is conveyable perpendicularly to the magnetic direction of flux in the air gap stray range between the magnetizable part 1 of the body and the pole pieces 2, 2' of the magnetic system. In this connection, the direction of rotation of the control current relative to the magnetic direction of flux in the interior of the respective air gap is in the stray range of one air gap directed opposite to the direction of rotation of the control current in the stray range at the other air gap at the same time. For position-sensing there are in a manner known per se sensing devices employed, the outlet signals of which affect the control current in the control current conductors 3, 3'.

Figure 2:
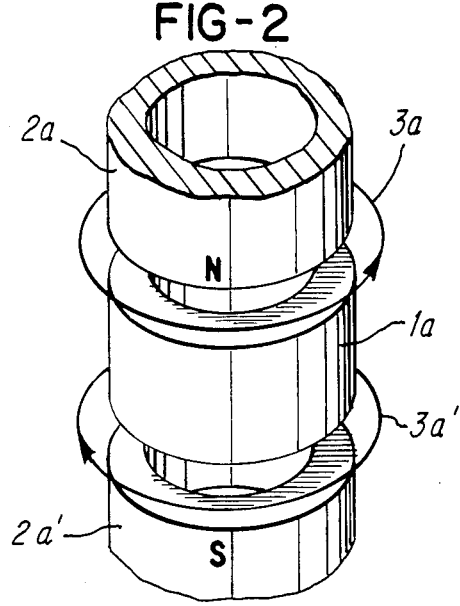

FIG. 2 shows a magnetic bearing element for rotatable bodies in an illustration explaining the principle of the system. The magnetizable part 1a of the body and the pole pieces 2a, 2a' of the magnetic system are tubular. With this design, a considerable increase is obtained in the radial bearing forces and this is due to the nearly double marginal length of the air gap in comparison to bearing parts which are made of cylinders of the same diameter. The control guiding means 3a, 3a' consists of an annularly closed electrical conductor while each control guiding means extends in the stray range of the air gaps.

Figure 3:
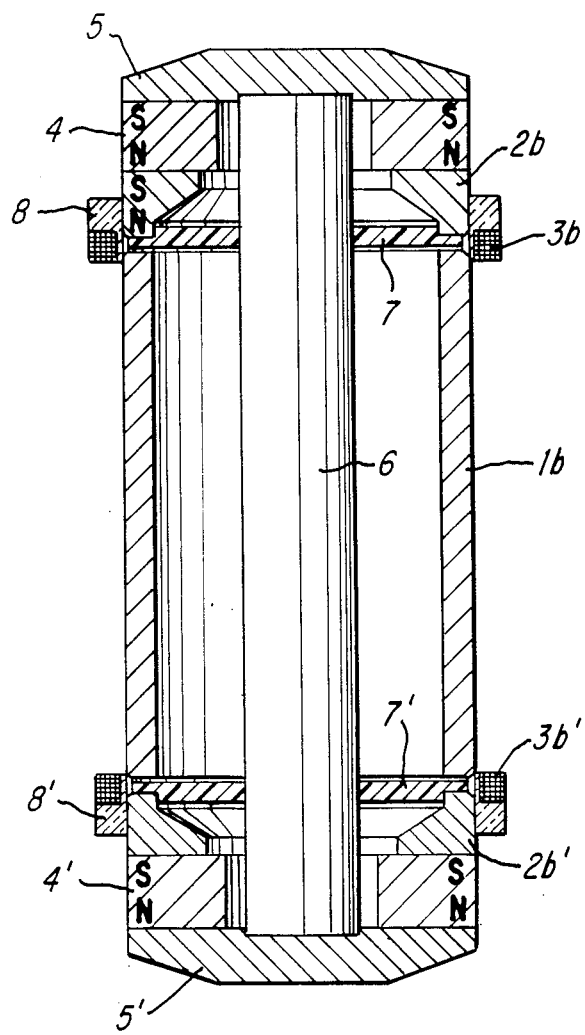

FIG. 3 diagrammatically shows an embodiment of a contactfree bearing element for rotatable bodies. The magnetizable part 1b of a rotor to which, for instance, a fly wheel is connected, and the pole pieces 2b, 2b' of the magnetic system are in the same manner as the corresponding parts of FIG. 2 designed as hollow cylinder. The magnetizable part 1b as well as the tubular pole pieces 2b, 2b' of the magnetic system consists of magnetically well conductive material. Connected to the pole pieces 2b, 2b' are annular magnets 4, 4' for generating the permanent magnetic field. For the magnetic return flux, the annular magnets 4, 4' contact the end discs 5, 5' which close the bearing element at both sides. Between said discs 5, 5' there is provided a flux conductive member 6 which extends along the axis of rotation of the bearing element. The centering of the pole pieces 2b, 2b' of the magnetic system relative to the flux conductor 6 is effected by means of centering plates 7, 7'.

The control current guiding means 3b, 3b' shown in the embodiment according to FIG. 3 are designed as annular coils while as winding body 8, 8' for the coils, preferably nonconductive material is employed. For purposes of a contactfree position sensing of the magnetizable part 1b of the rotatable body, the control current guiding means 3b, 3b' are as a component of a phase-bridge discriminator passed through by a high-frequency alternating current in addition to being passed through by the control current. The position-sensing of the journalled body in the bearing element is effected by comparing the coil impedances of the control guiding means 3b, 3b' by means of the phase-bridged-discriminator varies with an axial displacement of the magnetizable part 1b in a linear manner and affects the control current in the control current guiding means 3b, 3b' so that the magnetizable part 1b of the rotor will be held by the pole pieces 2b, 2b' of the magnetic system in a contact-free manner.

Figure 5:
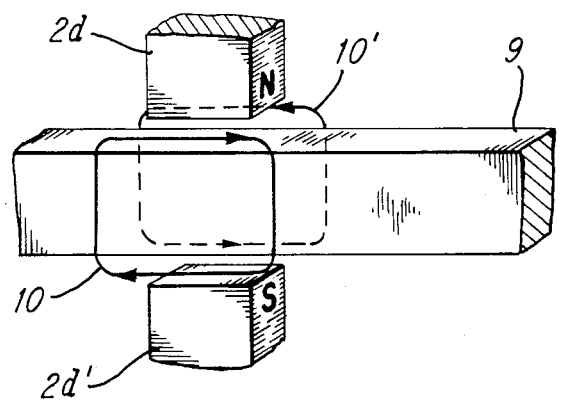
FIG. 5 shows a contact-free bearing element for linearly movable particles.
Figure 4:
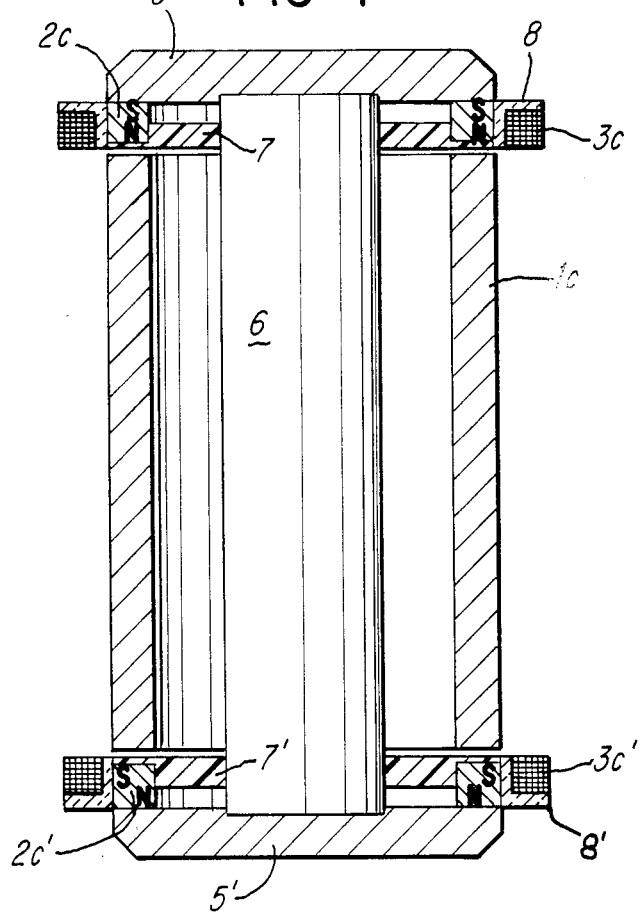
FIG. 4 is a longitudinal section through another embodiment of a contact-free bearing element for rotatable bodies.

The bearing element illustrated in FIG. 4 corresponds in its construction to the bearing element according to FIG. 3. According to a further development of the invention, however, with this bearing element of FIG. 4, the pole pieces 2c, 2c' of the magnetic system are made of a highly coercive material such as for instance a rare earth cobalt compound which in addition to having a high magnetic energy density also has a very low magnetic conductivity. In the embodiment shown in FIG. 4, the poled pieces 2c, 2c' take over the function of the magnets of the magnetic system which magnets maintain the permanent magnetic field. The control current guiding means 3c, 3c' which in the same manner as with the embodiment of FIG. 3 consists of coils wound onto winding bodies 8, 8' are arranged on the outer mantle surface of the tubular pole pieces 2c, 2c'. The low magnetic coercivity of the pole pieces 2c, 2c' permits a considerable increase of the cross sections of the control current guiding means 3c, 3c' with regard to the dimensions of the prevalent air gaps. In view of the low magnetic conductivity of the pole pieces, the magnetic fields and the bearing forces generated by the fields practically in an unimpeded manner superimpose each other, namely the magnetic fields generated within the region of the air gaps and the magnetic fields generated by the control current guiding means which fact is not possible when employing poling pieces of magnetically well conductive material. The increase in the cross section of the control current conducting means advantageously reduces the electric power which is necessary to be furnished for a contact-free mounting of the bodies. An embodiment of the bearing element according to the invention which is suitable for the contactfree mounting of a linerly movable article is diagrammatically illustrated in FIG. 5. With this bearing element, the magnetisable part consists of a stationary rail 9 which is passed through between pole pieces 2d, 2d' of a magnetic system. The pole pieces 2d, 2d' are components of a linerly moved subject. The control current guiding means extending in the stray ranges of the air gap are coils arranged on both respectively opposite sides of rail 9 and are at one of the sides connected in series to each other to an annularly closed conductor 10, 10'.

The magnetizable part of the body to be journalled is arranged between both pole pieces of a permanent magnet. Consequently, a simple closed permanent magnetic circuit is formed in the bearing element. The foregoing relationship has particular meaning because a permanent magnetic conducting means or circuit of magnetic potential is provided, flowing in a unitary direction with a bearing in both air gaps between the magnetizing part of the body and the permanent magnet. The control current conducting means are arranged in the magnetic stray range of the air gap; vibration of a magnetic field is caused in the stray range of this air gap. The direction of rotation of the control current in the control means of one gap is opposite to that of the control current in the other control means of the other gap at the same times, or in other words, simultaneously and instantaneously with respect to each other (with reference to the magnetic flux direction in the inside of the particular air gap in a control-current conducting means).

The present invention differs extensively from the known bearing elements, and this can be recognized in the drawings. Through the arrangement of the magnetizable part of the body to be journalled between both poles of a permanent magnet there prevails permanent magnetic permeation of magnetic flux in the same direction in both air gaps. This is a great advantage over the known bearing elements. A polarization or premagnetism extending in a unitary direction within the permanent magnetic permeation or penetration permits optimum utilization of the permanent magnetic material with respect to gaining of a maximum magnetic power flux in the air gaps. The permanent magnets are permitted to operate in the proximity of the maximum residual magnetism which is furthered by the ferro-magnetic return pate. The attainable specific bearing forces with the inventive teaching correspondingly are considerably higher than with the previously known bearing elements. Thus, the inventive bearing element is especially suitable for journalling heavy rotors in an advantageous manner.

The part 1 of the bearing element to be journalled is arranged between opposed polarized poles 2, 2' of a permanent magnet, in other words, between the north pole and the south pole 2, of the magnetic means (compare sketch FIG. 2 as attached to the amendment).

With the present inventive bearing element, there is not provided any ferro-magnetic connection between the air gaps between part 1 to be journalled and poles 2, 2' of this permanent magnetic means. The known bearing elements are stabilized by way of ferro-magnetic cores, which however, are completely unusable for the embodiment of a bearing of the present inventive type. Ferro-magnetic cores create a magnetic short circuit.

It should also be noted that the inventive bearing element provides a separate current flow guide or control means at both air gaps respectively instead of being arranged upon the ferro-magnetic cores as was previously done.

In addition, in the embodiment of the present invention the concern is not only that the pole pieces of the permanent magnet system are located across from each other in space, but also that these poles are oppositely polarized for formation of a closed permanent magnet circuit. The maximum potential difference available from the permanent magnet circuit occurs between the faces of opposed poles directly at the gaps.

What is claimed is:

1. A contact-free magnetic bearing assembly having a member supported magnetically for movement relative to a support structure, spaced magnetic poles positioned facing one another and also having opposite polarities of those poles which face one another, said poles forming a continuous magnetic circuit having a magnetic path between said poles, a magnetic member between said poles through which said magnetic path passes to support said magnetic member for movement in said path and relative to said poles, the opposite magnetic poles producing a stray range bordering said path adjacent said movable member and adjacent the gaps between the movable member and the opposite magnetic poles, electromagnetic means adjacent said path in said stray range bordering said gaps forming a magnetic field parallel to said magnetic path to produce opposed magnetic forces acting on said magnetic member adjacent the opposite poles to oppose movement of said member out of said path, and sensing means detecting changes in position of said magnetic member relative to said poles and altering the current flow through said electromagnetic means to oppose movement of said magnetic member out of said path between said poles.

2. A contact-free magnetic bearing according to claim 1 in which said electromagnetic means comprises a coil means adjacent and in surrounding relation to each said gap in a plane perpendicular to direction of the magnetic field extending between said poles.

3. A contact-free magnetic bearing according to claim 1 which includes sensing means sensitive to variations in the relative positions of said members from an equilibrium position for energizing said electromagnetic control means to develop influences in said gaps tending to restore said equilibrium position.

4. A contact-free magnetic bearing according to claim 1 in which said poles include at least pole pieces at the ends of said poles nearest one another which are formed of a high coercive material with low magnetic conductivity.

5. A contact-free magnetic bearing according to claim 1 in which said electromagnetic means comprises a pair of coils on respectively opposite sides of said magnetic path, each having a side adjacent each air gap, the currents in said coils flowing in respectively opposite directions when the coils are energized.

6. A contact-free magnetic bearing according to claim 1 in which said support structure includes a rail extending perpendicular to the axis of said magnetic field, said magnetic member being movable in a direction parallel to the rail.

7. The combination according to claim 1, characterized in that the poles are made of a highly coercive material having low magnetic conductivity.

8. The combination according to claim 1, characterized in that the control current flowing in the electromagnetic means is regulated by the output signal from a phase-bridge discriminator containing the control-current guides as components.

9. The combination according to claim 1 characterized in that at least one of the parts of the electromagnetic means in the stray range of the one air gap is connected, in an electrically conducting manner, with at least one part of the control means in the stray range of the other air gap.

10. The combination according to claim 1, characterized in that a part of the electromagnetic means of the one gap is joined to a part of the electromagnetic means of the other gap to make a closed annular conductor circuit.

11. The combination according to claim 1, characterized in that the magnetizable part of the magnetic member is in the form of a rail running at right angles to the magnetic flux, within the gap between the poles, the poles being secured to an object moving along the said rail without coming into contact therewith.

12. A contact-free magnetic bearing assembly having a member supported magnetically for rotary movement about its axis relative to a support structure, comprising: opposite magnetic poles on said support structure forming a continuous magnetic path, a rotary magnetic member between said opposite poles in said magnetic path with its axis of rotation parallel to said path, so that the said magnetic member is supported out of contact between said opposite poles with gaps between said poles and magnetic member, said opposite magnetic poles forming a stray range bordering said magnetic path opposite each of said gaps, electromagnetic means adjacent each of said gaps having a control current therein to form a magnetic field adjacent said gap parallel to said magnetic path, the magnetic fields adjacent said two gaps being in opposite directions along an axial line, and each magnetic field adjacent a gap being in opposite, axial directions on opposite sides of said rotary members to oppose movement of said member out of said path, and sensing means detecting changes in position of said magnetic member relative to said poles and altering the control current flow through said electromagnetic means to oppose movement of said magnetic member out of said path between said poles.

13. A magnetic bearing assembly as claimed in claim 12, said opposite magnetic poles being permanent magnetic members producing a constant magnetic path in a magnetic circuit, and said electromagnetic means being constituted by an electromagnetic coil bordering each gap and coaxial with the axis of said rotary member to form a magnetic field about said coil and coaxial with said rotary member, the control currents in said electromagnetic means being approximately zero in condition of equilibrium of said rotary member in said magnetic path.

14. A contact-free magnetic bearing according to claim 10 in which said members are rotationally symmetric about the axis of said magnetic field.

15. A contact-free magnetic bearing according to claim 12 in which said poles are in the form of coaxial tubular elements having one and the same diameter at the ends nearest one another.

16. A contact-free magnetic bearing according to claim 12 in which said support structure includes a portion on the axis of said magnetic field forming a flux return path between said poles.

17. A contact-free magnetic bearing according to claim 12 in which said support structure includes a portion on the axis of said magnetic path smaller in diameter than said poles and connected thereto and forming a flux return path between said poles.

18. A contact-free magnetic bearing according to claim 12 in which said electromagnetic means are adapted for connection in a bridge circuit which, in turn, controls the supply of energizing current to said coils.

19. The combination according to claim 12, characterized in that the magnetizable part of the rotary member and the poles are made rotationally symmetrical in relation to the direction of the magnetic path.

20. The combination according to claim 12, characterized in that the magnetizable part of the body, and the poles, are made of coaxially arranged pieces of tube having the same diameter at the gap.

21. The combination according to claim 12, characterized in that a flux conductor, running along the axis of rotation of the magnetic member and the poles, is provided for the return of the magnetic flux.

22. A contact-free magnetic bearing assembly, comprising:
an annular rotor mounted by the bearing for rotation about a vertically extending central axis, and
an assembly for mounting the rotor, the assembly comprising:
a central vertically extending flux conductor of ferro magnetic material aligned with the central axis and having ends which extend beyond the ends of the rotor;
pole pieces secured to opposite ends of the flux conductor;
an annular permanent magnet secured to said pole pieces on each end of said flux conductor, the permanent magnets having poles oriented in the same direction wherein the permanent magnets cooperate with the flux conductor and its ends to form a closed magnetic circuit, the permanent magnets being spaced apart to define a space which is slightly wider than the length of the annular rotor wherein gaps occur between the ends of the rotor and each magnet while the rotor is suspended in the mounting assembly by the magnetic circuit, whereby the magnetic field extends across the gaps and strays laterally of the gaps;
coils positioned adjacent to each gap within the range of the stray magnetic fields occurring laterally of the gaps, said coils forming electromagnetic means upon passing a control current therethrough to form opposed magnetic fields adjacent to the gaps parallel to the magnetic paths across the gaps, whereby the magnetic fields oppose axial movement of the rotor out of the path and out of equilibrium, said coils sensing changes of the position of the rotor relative to the poles whereby said sensed changes alter the control current flow through said coils to oppose movement of said rotor out of equilibrium between the poles.

23. The contact-free magnetic bearing of claim 22, wherein each permanent magnet is an assembly including an annular permanent magnet member and a pole piece disposed between the permanent magnet member and gap, and wherein the pole pieces have a surface juxtaposed with the gap having a width which is substantially equal to the thickness of the rotor wall.

24. The contact-free magnetic bearing of claim 22 wherein the width of the permanent magnet is substantially equal to the thickness of the rotor wall.

* * * * *